Nov. 1, 1932.　　　A. C. ESTEP　　　1,885,338
FUEL RELIEF VALVE
Filed Nov. 1, 1924　　　2 Sheets-Sheet 1
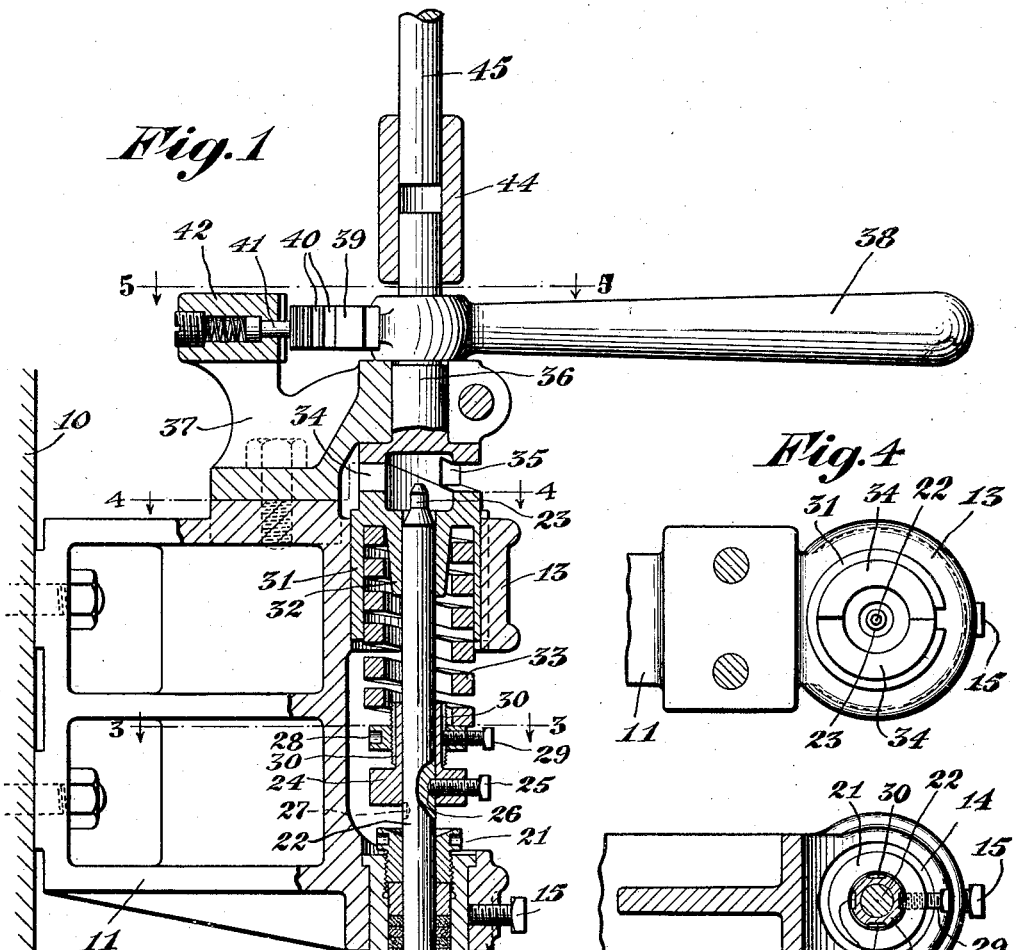
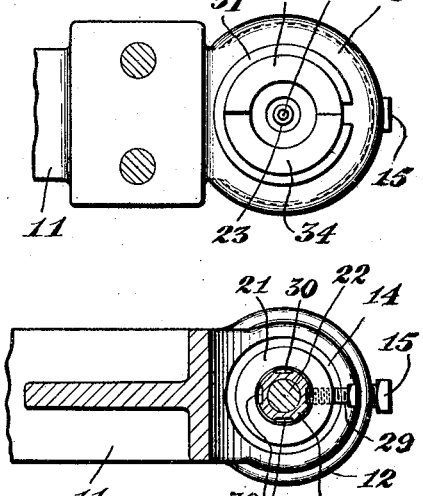
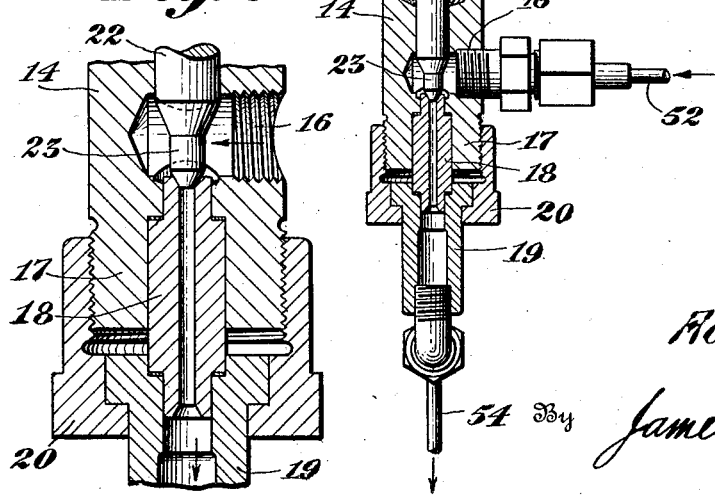
Inventor
Adrian C. Estep.
By James E. Sproll
Attorney.

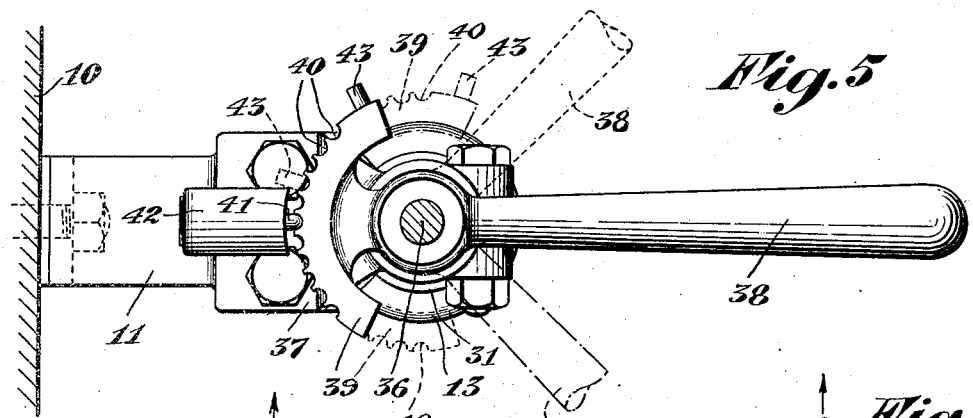
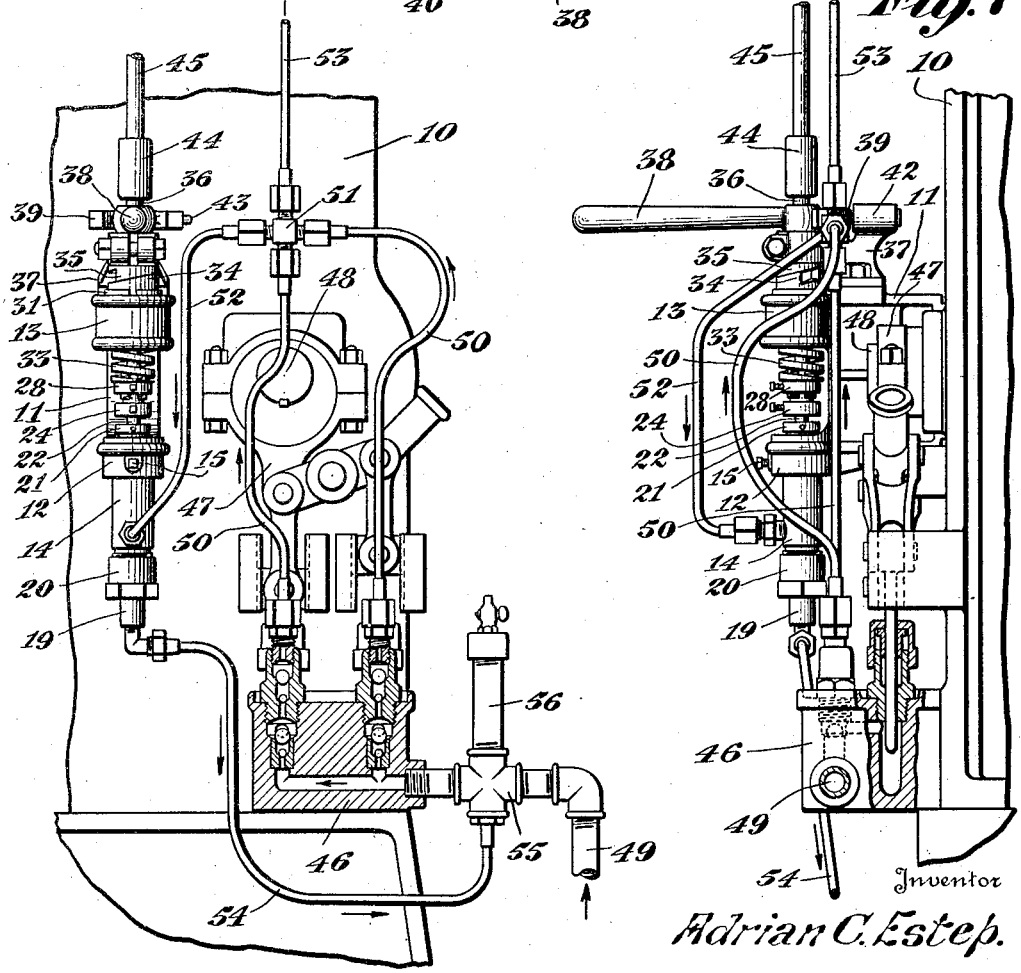

Patented Nov. 1, 1932

1,885,338

UNITED STATES PATENT OFFICE

ADRIAN C. ESTEP, OF SEATTLE, WASHINGTON

FUEL RELIEF VALVE

Application filed November 1, 1924. Serial No. 747,312.

The present invention contemplates interposing an improved and novel type of fuel relief valve within the fluid fuel supply system of an internal combustion engine, of the type wherein the fluid fuel is fed thereto at a high pressure, and the primary aim and fundamental object of the invention is the provision of a fuel relief valve designed to establish and maintain within said fluid fuel supply system a working pressure which will give the best and most efficient results for a given speed of the engine, embodying co-acting and correlated adjustable mechanism therein, to provide therefor a wide range and fine gradation of settings and adjustments for minimum terminal pressures and for working pressures greater than said minimum terminal pressures, whereby said valve may be quickly and positively set at or adjusted for actuation at a selected or predetermined minimum terminal pressure and may be instantaneously and positively set or adjusted for actuation at a selected or predetermined working pressure greater than said minimum terminal pressure.

With these ends in view the invention essentially resides in the provision of a spring pressed fuel relief valve, for a high compression type of internal combustion engine, and in the preferred embodiment thereof is characterized by the employment of manually operable adjusting mechanism, whereby the valve spring is subjected to a selective amount of initial compression to set or adjust the correlated valve stem for actuation at a selected or predetermined minimum terminal pressure, the amount of such initial compression and terminal pressure setting being based upon obtaining the most desirable operating results at the minimum speed of the engine; in combination with manually actuated or operable co-acting and self-locking cam mechanism, whereby the valve spring may be subjected to additional compression to set or adjust the valve stem for actuation at pressures greater than said minimum terminal pressure, to thereby establish and maintain the most desirable fluid fuel pressure within the fluid fuel supply system of the engine for engine speeds greater than said minimum engine speed, which require pressures greater than said minimum terminal pressure, to produce the maximum and most efficient results, at such greater engine speeds.

The invention further resides in the provision of a fuel relief valve embodying a reversible valve seat in combination with a reversible valve stem, whereby repairs to said valve may be expeditiously and economically made without removal of the valve from the operative position thereof.

The invention still further resides in the provision of a fuel relief valve embodying a supporting bracket in combination with a separable valve body removably secured therein, whereby the fabricating of said valve, the assembling of the same within said supporting bracket and the dismounting of the same therefrom is materially facilitated, while also readily permitting of the use of different materials in the fabrication of said supporting bracket and said valve body.

The invention further resides in the novel construction, combination, adaptation and arrangement of parts, as will hereinafter be more fully described and succinctly defined in the appended claims.

Referring now to the accompanying drawings wherein is illustrated the specific form of the invention, as at present preferred:

Figure 1 is a vertical medial section of a fuel relief valve fabricated in accordance with the invention, certain parts being shown in elevation and certain other parts broken away for clearness of illustration.

Fig. 2 is an enlarged fragmentary vertical section of the lower portion of the same.

Fig. 3 is a fragmentary horizontal section taken through 3—3 of Fig. 1.

Fig. 4 is a similar section taken through 4—4 of Fig. 1.

Fig. 5 is a horizontal section taken through 5—5 of Fig. 1.

Fig. 6 is a fragmentary elevation of the rear end of an internal combustion engine illustrating the fuel relief valve, as it would appear when operatively connected to the fluid fuel supply system thereof, certain parts being in section and certain other parts broken away for clarity of illustration, and Fig. 7 is a fragmentary side elevation of the same with certain parts in section and certain other parts broken away.

In the accompanying drawings and in the following description I have elected to illustrate and describe the invention as applied to the fluid fuel supply system of an internal combustion engine of the high compression type, but, manifestly the fuel relief valve herein disclosed and described may be utilized in any capacity wherein fluid pressure control is desired, without departing from the spirit of the invention or the benefits derivable therefrom, the present showing being merely by way of illustration.

Referring now to the drawings wherein similar reference characters designate similar parts throughout the several views, the numeral 10 designates the rear wall of an internal combustion engine to which is suitably secured or bolted a rearwardly directed valve supporting bracket 11 having a lower boss 12 and an upper boss 13 integrally formed upon the rear end thereof in spaced and aligned relation.

Supported within the lower boss 12 and extending downwardly therefrom in axial prolongation thereto is a cylindrical valve body or casing 14 exteriorly flanged at the upper end to snugly fit within the counterbored upper end of the boss 12 and to be removably secured therein by a set screw 15 threadably engaged within the said boss and abutting the periphery of said valve body.

The valve body 14 is provided adjacent the lower end and upon one side thereof with an internally threaded inlet 16 communicating with a counterbored and exteriorly threaded lower or discharge end 17 having a reversible tubular valve seat 18 concentrically disposed therein, for which purpose it is exteriorly reduced or shouldered adjacent each end thereof, so that either end of the same may snugly fit within the counterbored end 17, and is normally maintained therein by a cylindrical valve seat retainer 19 exteriorly flanged at the upper end to snugly fit within a counterbored union nut 20 threadably engaged upon the exteriorly threaded lower end 17 of the valve body 14. The exteriorly flanged upper end of the valve seat retainer 19, fitting within the union nut 20, is counterbored to snugly fit upon the lower end, or end not in use, of the reversible valve seat 18, while the lower portion of said retainer 19 extends downwardly and outwardly through the union nut 20 in axial prolongation thereto and is internally threaded at the lower or outer end thereof.

Formed and disposed within the upper end of the valve body 14 is a stuffing box 21, wherein is slidably disposed the lower half of a reversible valve stem 22, the upper half of which extends upwardly therefrom in axial prolongation thereto. Either end of the reversible valve stem 22 may seat upon either end of the reversible valve seat 18, for which purpose the reversible valve stem 22 is tapered or shouldered adjacent the ends thereof to provide reduced portions 23, the hardened terminals of which are also tapered or bevelled to fit within and abut correspondingly hardened faces formed within the ends of said reversible valve seat 18. The tapered or shouldered portions formed upon the reversible valve stem 22 adjacent the ends thereof also serve to present to the fluid fuel pressure, within the fluid fuel supply system of the associated engine, sufficient surface area to actuate said valve when the pressure within said fluid fuel supply system exceeds the selected pressure for which the valve is set or adjusted, as will be readily apparent and manifest by referring to Figs. 1 and 2.

Concentrically mounted upon the reversible valve stem 22 is a reversible flanged exteriorly threaded sleeve 24 removably secured in position thereon, against axial and rotative movement, by a set screw 25, the inner end of which seats within a peripheral aperture 26, formed within the reversible valve stem 22 substantially midway of the length thereof, when the end of the valve stem remotest therefrom is in use, and which seats within a substantially diametrically opposed peripheral aperture 27, similarly formed within said valve stem, when the opposite end of the latter is in use and the sleeve 24 is positioned in reversed relation thereon.

Threadably engaged for adjustment upon the exteriorly threaded portion of the flanged reversible sleeve 24 is a spring adjusting nut 28 secured in a previously selected or predetermined adjusting position thereon, against axial and rotative movement, by a set screw 29, the inner end of which seats within a selected groove of a plurality of diametrically opposed grooves 30 cut in the periphery of the said exteriorly threaded portion in parallel relation to the axis thereof.

Slidably disposed and splined against rotative movement within the upper boss 13, of the valve supporting bracket 11, is a hollow cylindrical spring pressed cam member 31 having a hollow central boss 32 integrally formed therein adjacent the upper end thereof and extending downwardly therefrom, within which the upper end, or end not in use, of the reversible valve stem 22 is slidably disposed and guided. Interposed between the spring adjusting nut 28 and the cam member 31 is a spiral or helical spring 33, the lower end of which is adapted to abut said adjusting nut and the upper end to snugly fit within the annular seat formed by the cylindrical walls of said cam member and the hollow central boss 32 thereof. The cylindrical walls of the cam member 31 at the upper end thereof are helically cut to form and provide upwardly extending helical cams 34, which normally abut and contact with correspondingly cut downwardly extending helical cams 35 formed upon the lower end of an axially aligned cam adjusting spindle 36 mounted for rotative movement within a spindle supporting bracket 37 suitably secured or bolted to the upper side of the valve supporting bracket 11. The cam adjusting spindle 36 extends upwardly through the bracket 37 and rigidly secured to said spindle 36 in contiguous relation to the upper face of said bracket 37 is a cam adjusting or hand control lever 38 having an arcuate or segmental portion 39 integrally and symmetrically formed upon the inner end and in diametrically opposed relation to the hand hold portion thereof. Formed and provided within the periphery or perimeter of the arcuate portion 39 is a plurality of serrations or grooves 40 adapted to selectively receive and restrainingly engage a spring pressed locking pin 41 slidably disposed within a boss or housing 42 integrally formed upon the spindle supporting bracket 37 and having the axis thereof disposed in the plane of the axis of the hand control lever 38. A radially disposed stop pin 43 fixedly secured within one end of the arcuate portion 39 serves to limit the movement of the hand control lever 38 in one direction, to prevent the cams 35 overriding the cams 34, while the shoulders formed by said cams abut or lock and serve to limit the movement of said hand control lever in the opposite direction.

Rigidly secured upon the upper end of the cam adjusting spindle 36 and extending upwardly therefrom is a coupling 44, within the upper end of which is similarly secured the lower end of an upwardly extending remote control shaft 45, whereby the fuel relief valve herein disclosed may be adjusted and set for actuation at any desired pressure at any point remotely located therefrom, as will be obvious and apparent.

Manifestly by forming the valve body 14 separable and removable from the valve supporting bracket 11, as shown and described, the fabricating, assembling and dismounting of such valve body is materially facilitated and expedited, while also readily and conveniently permitting of the use of different materials for said valve body and bracket, a feature most desirable from the standpoint of economy in construction. Further by providing a reversible seat and stem for the valve body 14 repairs thereto are expedited and facilitated without added cost and the life of the fuel relief valve materially prolonged thereby, also such repairs may readily be made without removing the valve from the operative position thereof.

In Figs. 6 and 7 the numeral 46 designates a double plunger pump suitably secured to the lower portion of the rear wall 10 of the engine and actuated thereat by an eccentric 47 from a shaft 48 driven from said engine by appropriate operating connections. The pump 46 supplies fluid fuel for all of the cylinders of the engine, irrespective of the number thereof, and for this purpose the plunger chambers of said pump are connected upon the suction side thereof to a common suction or supply pipe 49 leading from a suitable source of fluid fuel, not shown, and upon the delivery or discharge side thereof are connected by upwardly extending delivery conduits 50 to a four-way fitting or cross 51. A pressure relief conduit 52 connects the four-way fitting 51 with the internally threaded inlet 16 of the valve body 14, while, an upwardly extending conduit 53 connects the upper terminal of the four-way fitting 51 with the inlet end of the fluid fuel manifold of the engine, not shown. The valve seat retainer 19 or outlet end of the fuel relief valve is connected by a fluid fuel overflow conduit 54 to a cross or four-way fitting 55 interposed within the suction pipe 49 and having a suction pipe air chamber 56 mounted within the upper terminal thereof.

To set or adjust the fuel relief valve for a selected or predetermined minimum terminal pressure, based upon obtaining and securing the most desirable and effective operating results from the associated engine at the minimum speed thereof, the hand control lever 38 is moved to the position indicated in dot and dash lines in Fig. 5, thereby relieving the helical spring 33 from compression by the complemental helical cams 34 and 35, respectively, whereupon the set screw 29 is released to permit adjustment of the spring adjusting nut 28 upon the exteriorly threaded portion of the flanged reversible sleeve 24, whereby the helical spring 33 is further compressed or the compression thereon is relieved depending upon the rotative direction given the adjusting nut 28, to thus set or adjust the correlated valve stem 22 to obtain and establish the desired minimum terminal pressure within the fluid fuel supply system of the engine, and whereat said valve stem will be actuated with the engine operating at minimum speed to produce the maximum and most efficient results at such minimum engine speed. It will therefore be obvious and apparent from the foregoing that by rotating the adjusting nut 28 to further compress the helical spring 33 a higher minimum terminal pressure will be established and maintained in the fluid fuel supply system for a higher minimum engine speed, while, by rotating said adjusting nut 28 to relieve the compression upon said helical spring 33 a lower minimum terminal pressure will be established and maintained within said fluid fuel supply system for a lower minimum engine speed.

With the minimum terminal pressure setting or adjustment thus obtained and established, the set screw 29 is reseated within the nearest groove 30, to thereby positively retain the adjusting nut 28 against rotation or displacement upon the flanged reversible sleeve 24, after which the hand control lever 38 may be moved or traversed to the position indicated in full lines in Fig. 5, or to the position indicated in dotted lines in said figure, or to any position intermediate of the positions herein shown and described, depending upon the working pressure setting and adjustment found most desirable and suitable for the specific engine speed. By moving or traversing the hand control lever 38 in the manner and direction herein disclosed the complemental helical cams 34 and 35, respectively, are caused to still further compress the helical spring 33, to thereby increase the resistance of the latter to the fluid fuel pressure within the fluid fuel supply system of the engine and to establish and maintain therein fluid fuel working pressures deemed most desirable and found most effective for engine speeds greater than the minimum engine speed, which require working pressures greater than the aforementioned minimum terminal pressure, to produce the maximum and most efficient results, at such greater engine speeds. When the hand control lever 38 is in the position indicated in dotted lines the fuel relief valve is set or adjusted for the maximum working pressure in relation and with respect to the minimum terminal pressure setting or adjustment of the adjusting nut 28 upon the flanged reversible sleeve 24, as will be readily apparent by referring to the drawings. The hand control lever 38 is positively retained and restrainingly engaged against movement or displacement from any selected or adjusted position by the spring pressed pin 41 seating within the groove 40 nearest thereto.

Manifestly therefore, the fluid fuel relief valve herein shown and described is regulated to establish and maintain within the fluid fuel supply system of the engine the working pressure which gives the best results for a given speed of the engine. In practice and after exhaustive tests it was found that an engine of the type herein disclosed operates more smoothly with lower working pressures at lower speeds with reduced loads and that higher working pressures are desirable and necessary at higher speeds with greater loads, for the reason that by increasing the working pressures at higher speeds with greater loads better atomization of the increased volume of fluid fuel required at such higher speeds is substantially insured and assured.

From the foregoing it will be obvious and apparent that by employing in a fuel relief valve the spring adjusting nut 28 with the associated and correlated parts thereof in conjunction and cooperation with the complemental helical cams 34 and 35, respectively, and correlated parts thereof, as herein shown and described, a wide range and fine gradation of settings or adjustments for minimum terminal pressures may be positively and quickly had and obtained and similarly for working pressures greater than said minimum terminal pressures, and that such fuel relief valve may be instantaneously and positively set and adjusted for actuation at such greater pressures at the will of the operator.

In the operation of the fuel relief valve assuming that the correlated and co-acting adjustable mechanisms thereof have been set or adjusted for a specific working pressure, which is the pressure desired to establish and maintain within the fluid fuel supply system of the engine, it follows, therefore, that if such pressure is exceeded the reversible valve stem 22 is caused to be elevated thereby from the seat thereof, to thus relieve or exhaust such excess pressure, which is thereupon discharged into the overflow conduit 54 and passes therethrough to the suction side of the double plunger pump 46, which latter when driven at a constant speed supplies fluid fuel to the said fluid fuel supply system at a constant rate equal to or greater than that required for the maximum load.

While I have herein shown and described my invention with sufficient detail to enable those skilled in the art to understand the mode of construction and the principles involved, it is to be understood that there is no intentional limitation herein to the specific form and precise details of construction of the invention, as shown and described, except as expressly defined by the appended claims, and that various modifications of such construction may be resorted to without departing from the invention or the benefits derivable therefrom. I also desire it to be understood that certain features of the invention herein shown and described may be employed in other combinations than those herein shown.

What I claim as my invention, and desire to secure by Letters Patent of the United States, is:—

1. In a relief valve, in combination, a valve supporting bracket, a valve body removably secured within said bracket, a valve stem seating within said valve body, a compression spring for said valve stem, an exteriorly threaded sleeve removably secured upon said valve stem, a spring adjusting nut threadably engaged upon said sleeve to regulate the initial compression upon said spring to thereby predeterminately set said valve stem for actuation at a selected minimum terminal working pressure, a cam member slidably disposed within said valve supporting bracket to receive said spring and to co-act with said spring adjusting nut, and manually operable means engaging said cam member to increase the compression upon said spring to predeterminately set said valve stem for actuation at a selected working pressure greater than said minimum terminal working pressure.

2. In a relief valve, in combination, a valve supporting bracket, a valve body removably secured within said bracket, a reversible valve stem seating within said valve body, a compression spring for said valve stem, an exteriorly threaded reversible sleeve removably secured upon said valve stem, a spring adjusting nut threadably engaged upon said sleeve to regulate the initial compression upon said spring to thereby predeterminately set said valve stem for actuation at a selected minimum terminal working pressure, a helical cam member slidably disposed within said valve supporting bracket to receive said spring and to co-act with said spring adjusting nut, a helical cam adjusting spindle rotatively mounted upon said valve supporting bracket and co-acting with said helical cam member, and a hand control lever fixedly secured to said helical cam adjusting spindle to increase the compression upon said spring to predeterminately set said valve stem for actuation at a selected working pressure greater than said minimum terminal working pressure.

3. In a relief valve, in combination, a valve supporting bracket, a valve body removably secured within said bracket, a reversible valve seat disposed within said valve body, a reversible valve stem seating within said valve body upon said reversible valve seat, a compression spring for said valve stem, an exteriorly threaded reversible sleeve removably secured upon said valve stem, a spring adjusting nut abutting the lower end of said spring and adjustably secured upon said sleeve to regulate the initial compression upon said spring to thereby predeterminately set said valve stem for actuation at a selected minimum terminal working pressure, a hollow cylindrical helical cam member slidably disposed and splined against rotation within said valve supporting bracket to receive the upper end of said compression spring and to co-act with said spring adjusting nut, a spindle supporting bracket rigidly secured to the upper side of said valve supporting bracket, a helical cam adjusting spindle rotatively mounted within said spindle supporting bracket to co-act with said cylindrical helical cam member, a hand control lever fixedly secured to said cam adjusting spindle to increase the compression upon said spring to predeterminately set said valve stem for actuation at a selected working pressure greater than said minimum terminal working pressure, and restrainingly engaging means mounted upon said spindle supporting bracket to positively retain said hand control lever in a selected adjusted position.

4. The combination with the stem and spring of a relief valve, of an exteriorly threaded sleeve removably secured upon said stem having a series of longitudinal grooves cut in the periphery thereof, a nut threadedly engaged upon said sleeve for regulating the initial compression of said spring, and means selectively engageable with said grooves for retaining the nut in an adjusted position upon the sleeve.

In testimony whereof I affix my signature.

ADRIAN C. ESTEP.